US006618380B1

United States Patent
Mehta et al.

(10) Patent No.: US 6,618,380 B1
(45) Date of Patent: Sep. 9, 2003

(54) PRIORITY QUEUEING

(75) Inventors: Vineet Mehta, North Andover, MA (US); Martin Ernst Mueller, Shrewsbury, MA (US); Muralidharan Sampath Kodialam, Marlboro, NJ (US); Yung-Terng Wang, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/392,860

(22) Filed: Sep. 9, 1999

(51) Int. Cl.[7] .......................... H04L 12/28; H04L 12/56
(52) U.S. Cl. .................. 370/395.42; 370/412; 370/465
(58) Field of Search .................... 370/229, 230, 370/232, 235, 351, 352, 353, 395.1, 395.21, 395.41, 395.42, 395.43, 395.5, 395.6, 395.71, 412–413, 415, 417, 465–468

(56) References Cited

U.S. PATENT DOCUMENTS

| 5,231,633 A | * | 7/1993 | Hluchyj et al. ............. 370/429 |
| 5,949,789 A | * | 9/1999 | Davis et al. ................ 370/452 |
| 6,169,748 B1 | * | 1/2001 | Barbas et al. ............... 370/468 |
| 6,262,986 B1 | * | 7/2001 | Oba et al. ................... 370/399 |
| 6,470,016 B1 | * | 10/2002 | Kalkunte et al. ...... 370/395.41 |

OTHER PUBLICATIONS

Briem et al. "Traffic Managemetn for an ATM Switch with Per–VC Queuing: Concept and Implementation". IEEE Communications Magazine. Sep. 21–26, 1997. pp. 88–93.*
Matsufuru et al. "Efficent Fair Queuing for ATM Networks using Uniform Round Robin". IEEE Infocomm 1999. Mar. 21–25, 1999. pp. 389–397.*
Shimoshishi et al. "An Improvement of Weighted Round Robin Cell Scheduling in ATM Networks". IEEE Global Telecommunications Conference. Nov. 3–8, 1997. pp. 1119–1123.*
Bennett et al. "High Speed, Scalabe and Accurate Implementation of Packet Fair Queueing Algorithms in ATM Networks". IEEE Network Protocols. Oct. 28–31, 1997. pp. 7–14.*

* cited by examiner

Primary Examiner—Melvin Marcelo
Assistant Examiner—Derrick W Ferris (57) ABSTRACT

Apparatus and a method are disclosed for providing a priority queuing arrangement in the transmit direction in Inter-Working Units (IWUs) that permits Frame Relay data packets or ATM cells from channels that have contracted for a particular level of bandwidth service to be provided that service, even during heavy traffic periods when there is contention for resources in the IWU.

15 Claims, 7 Drawing Sheets

PRIORITY QUEUEING

FIELD OF THE INVENTION

This invention relates to a method and apparatus for managing queued data and, in particular, for prioritizing data packets flowing through equipment in packet switched networks to provide specific bandwidths to customers.

BACKGROUND OF THE INVENTION

Frame Relay networks have proven to provide a successful wide area networking service as evidenced by the exponential increase in the market of Frame Relay services and access devices. Frame Relay network service is provided by most carriers, Regional Bell Operating Companies (RBOCs), and some non-traditional service providers like Compuserve. Asynchronous Transfer Mode (ATM) switching networks, on the other hand, are gaining momentum in the industry and ATM networks are likely to become the preferred backbone networking technology in the future because of its ability to support a wide variety of network services.

It is envisioned that Frame Relay networks and ATM networks and services will coexist and be inter-connected by Inter-Working Units (IWUs) for some time until ATM networks becomes a more mature, stable, cost-effective technology. These IWUs accomplish the frame/packet format translations between Frame Relay networks and ATM networks. Frame Relay networks will continue to provide effective services for OC-3 or lower access speeds. In addition, it is unlikely that the Frame Relay network service users will forego their investments in Frame Relay network equipment in favor of ATM network service and equipment.

In networks there are typically a large number of defined channels over which data packets are carried. Each channel shares the resources of the network. Typically, a minimum bandwidth is assigned to each channel in the network according to a contract between the network provider and an entity to which a channel is assigned.

Network resources of the type in which a minimum bandwidth is contracted for by each channel have suffered from a variety of problems in their allocation of bandwidth to the active channels at a resource, i.e., those channels at the resource that are carrying data elements at a particular time. Resource scheduling is required whenever there is a contention for network resources among contending "flows". The prior art teaches some solutions to resource scheduling such as round-robin scheduling and polling scheduling, but each of these solutions are generally constrained in their ability to adapt to different types of operation.

One such problem is how to assign available bandwidth for network resources among active channels. Another problem relates to insuring that the active channels are allowed to actually make use of all of the bandwidth for which they have contracted. This problem arises because it is possible that an end-to-end protocol being employed over a channel may interact with congestion control mechanisms employed by the network in such a way that a channel's contracted-for bandwith is never actually achieved.

Additional problems arise in the area of congestion control. Prior art congestion control techniques tended, in the face of congestion, to drop data packets from channels that exceeded their contracted-for bandwidth. This, however, could exacerbate the congestion by causing such channels to restransmit their dropped data packets. Furthermore, such techniques for data packet dropping typically result in the retransmission over a channel of more data packets than were actually dropped. Another problem with prior art congestion control techniques is that many of them result in high delays for data packets in those channels that are transmitting within their contracted-for bandwidth. Lastly, errors that occur in the estimation of the actual bandwidth being used by each channel may cause a particular channel's data packets to be dropped even though such a channel is actually within its contracted-for bandwidth. This unnecessary data packet dropping results in additional data packet retransmissions and, potentially, additional congestion.

Another source for problems in the area of congestion control area has been in the Inter-Working Units (IWUs) which typically have not had resource scheduling to help provide contracted bandwidth. These tended to negate resource scheduling introduced elsewhere in the networks.

Thus, there is a need in prior art IWUs for priority queuing of data packets as they pass through to assure that individual channels receive and are allowed to actually make use of the bandwidth for which they have contracted.

SUMMARY OF THE INVENTION

The foregoing need in the prior art is satisfied by the present invention. A priority queuing arrangement in the transmit direction of Inter-Working Units (IWUs) is provided that permits Frame Relay data packets or ATM cells from channels that have contracted for a particular level of bandwidth service to be provided for that service, even during heavy traffic periods when there is contention for resources in the IWU.

DESCRIPTION OF THE DRAWING

The invention will be better understood upon reading the following detailed description in conjunction with the drawings in which.

DETAILED DESCRIPTION

Figure 1:
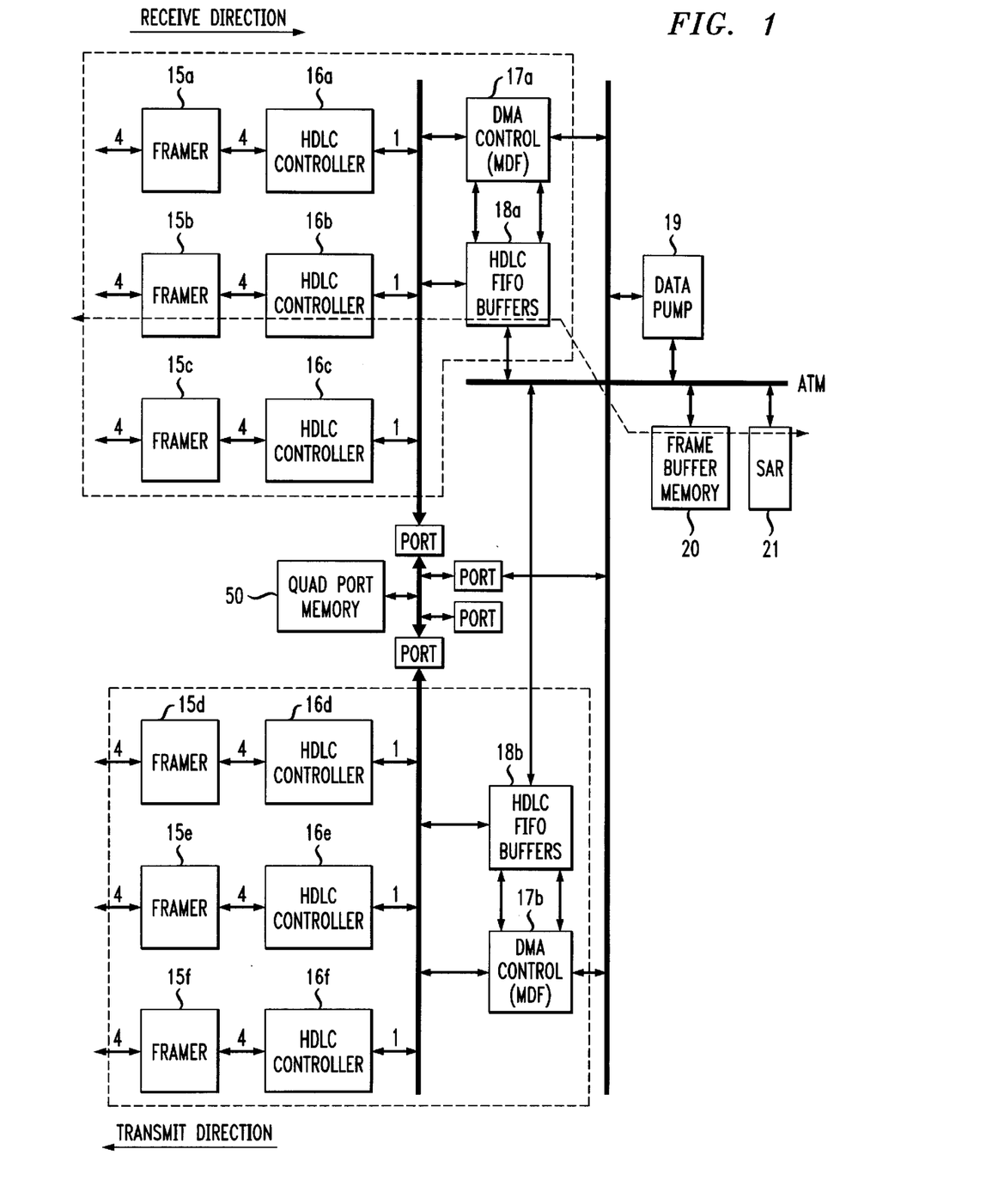
FIG. 1 is a detailed block diagram of an Inter-Working Unit (IWU) utilizing the present invention.

In FIG. 1 is a detailed block diagram of an Inter-Working Unit (IWU) that is utilized to implement the present invention. Data packets traveling from right to left through the IWU travel in the "transmit" direction, and data packets traveling from left to right through the IWU travel in the "receive" direction as indicated. The present invention applies to the flow of data packets in the "transmit" direction. The dotted line with an arrow head at either end passing through FIG. 1 illustrates a typical path taken by the data passing through the IWU in the receive direction. After the hardware and its operation is described generally the method for allocating bandwidth through the IWU in the receive direction is described. In the following description the data is referred to as being assembled into packets or frames. These two terms are used synonymously.

In the Inter-Working Unit (IWU) shown in FIG. 1 there are three main flows of information: (1) Frame Relay network to ATM network (receive direction), (2) ATM network to Frame Relay network (transmit direction), and (3) management information. These three flows share the bandwidth resources of the IWU shown in FIG. 1. The first two listed flows share the Frame Buffer Memory 20 which is statically partitioned, and all three flows share Data Pump 19 processing. In operation there are a number of queues within the IWU that are polled by Data Pump 19. They are: (1) DMA Control 17 attention queues, (2) HDLC Controller 16 acknowledgement queue (one per HDLC), (3) SAR 21 acknowledgement queue, (4) SAR 21 attention queue, (5) management data packets, (6) management control, and (7) management acknowledgement. The Buffer Memory 20 resources are shared to handle the three main flows of information and the many queues enumerated above.

The HDLC Controller 16 accepts requests from the Management CPU (MCPU) to execute one of twelve commands listed below. The requests arrive at the HDLC Controller 16 through an Inter-Domain Communications (IDC) interface. The HDLC Controller 16 polls the IDC layer for messages. The twelve commands that the MCPU can request the HDLC Controller 16 to execute are:

Create I/O port

Delete I/O port

Create a Logical Data Channel (LDC)

Delete an LDC

Activate an LDC

Deactivate an LDC

Reconfigure an LDC

Reset an LDC

Provide the statistics requested

Provide the status of an LDC

Provide the status on an I/O port

The handles and configuration parameters required for executing one of the above listed twelve commands successfully are provided to the HDLC Controller 16 in the IDC message from the MCPU. After the HDLC Controller 16 has executed the requested command, it returns a response message to the MCPU through the IDC layer. The response message from the HDLC Controller 16 contains the relevant handles, information regarding the success or failure of the request, and any additional information that is required.

The successful operation of management and provisioning functions between the MCPU and HDLC Controller 16 assumes that the HDLC Controller and the MCPU have been started and initialized. It is also assumed that the Framers and Quad Port Memory have been started and initialized.

Figure 2:
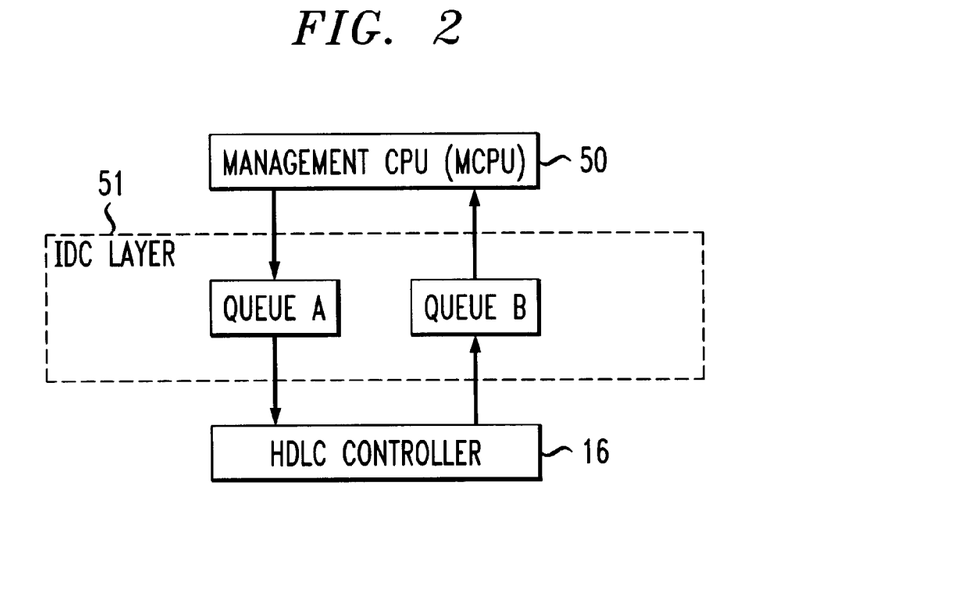
FIG. 2 is a block diagram showing how communications are handled between the Management CPU and the HDLC Controller.

In FIG. 2 is a block diagram showing how communications between MCPU 50 and HDLC Controller 16 are accomplished to provide the management and provisioning functions. The messages and responses between MCPU 50 and HDLC Controller 16 are passed through Queues A & B in IDC Layer 51.

The MCPU 50 sends messages including ones of the above listed twelve commands to HDLC Controller 16 by placing the messages in Queue A in the IDC layer. HDLC Controller 16 periodically polls Queue A for messages and, when it finds a message, it performs the requested task. As mentioned above the handles and configuration parameters required for executing one of the above listed twelve commands successfully are provided to HDLC Controller 16 in each message stored in Queue A by MCPU 50.

After HDLC Controller 16 has performed a requested command it returns a reply message to MCPU 50, indicating that requested command has been accomplished, by placing it in a Queue B in DC layer 51. MCPU 50 periodically polls Queue B and reads out any reply messages stored therein.

Figure 3:
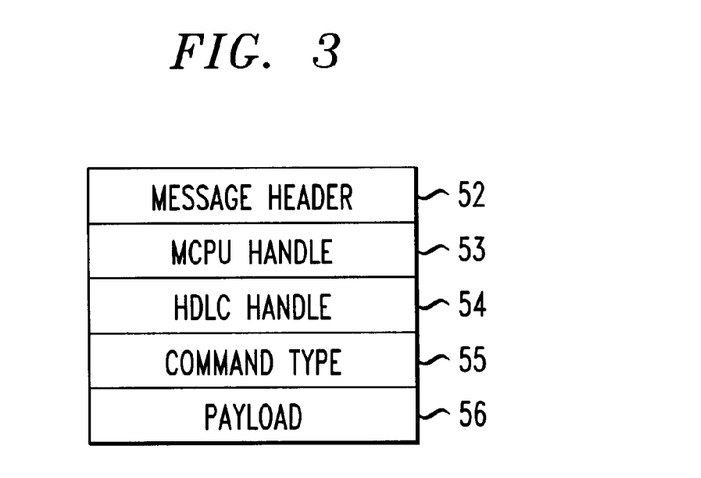
FIG. 3 shows the makeup of a message exchanged between the HDLC Controller and MCPU.

FIG. 3 shows the makeup of a message exchanged between HDLC Controller 16 and MCPU 50. Each message has five parts as shown in FIG. 2A. The Message Header field 52 is used by the IDC to deliver the message to the appropriate HDLC Controller 16a–16f. The MCPU Handle field 53 is used by MCPU 50 as a reference handle to context information in MCPU 50 that it provides to HDLC Controller 16. The HDLC Controller 16 uses this handle to access context information residing in the HDLC Controller. The HDLC Controller 16 provides this same handle back to MCPU 50 in the HDLC Handle field 54 when providing a response to the command from MCPU 50. The particular one of the above listed twelve commands to be executed by HDLC Controller 16 is placed in the Command Type field 55. The Payload field 56 contains additional parameters required for executing the command identified in Command Type field 55. When HDLC Controller 16 is responding to MCPU 50 after executing the requested command, the HDLC Controller 16 places status information and other MCPU 50 requested information in the Payload field 56 in a message sent back to MCPU 50.

Data Flow in the Receive Direction

In the receive direction of the IWU, as indicated by an arrow 10 in FIG. 1, each of Framers 15a–c has inputs from four T1/E1 bit streams. Each of these bit streams contains time division multiplexed signals from a number of sources. Due to the fact that data traveling over the network gets out of sync, each Framer 15 uses a 125 microsecond clock to re-synchronize the TDM data stream in a manner well known in the art, to thereby permit extracting the framed information using HDLC Controllers 16. Each HDLC Controller 16 can receive data on up to 128 logical data channels (4 bitstreams times 32 DS0 channels/bitstream). The re-synchronized data streams are input to an associated one of HDLC Controllers 16a–c as shown. Each of HDLC Controllers 16a–c segment their input T1/E1 bit streams into their assigned T1/E1 time division multiplexing (TDM) frames/packets and performs decoding and error checking on the TDM frames/packets, which are then temporarily stored in an HDLC FIFO Buffer 18a–b under control of its associated one of DMA Controls 17a or 17b. DMA Control 17 and HDLC FIFO Buffers 18 are the new elements that are provided to implement the invention. Each of HDLC FIFO Buffers 18a&b has three-hundred eighty-four temporary buffers, and each temporary buffer can hold one-hundred twenty-eight bits. Each DMA Control 17 handles three HDLC Controllers 16. As shown in FIG. 1, DMA Control 17a handles HDLC Controllers 16a–c, and DMA Control 17b handles HDLC Controllers 16d–f. Each DMA Control 17a and 17b is therefor responsible for twelve T1/E1 bit streams. The T1/E1 bit streams flowing into each of Framers 15a–f, and thence to HDLC Controllers 16, are time division multiplexed (TDM) signals from multiple sources and are de-multiplexed by the associated one of DMA Controls 17a and 17b.

It is the function of each HDLC Controller 16 to map and un-map the frames in the data streams flowing through all HDLC FIFO buffers 18 to logical data channels (LDCs). As part of this, RDLC Controller 16 performs the flag and zero-bit removal, and CRC checking functions. After its functions have been completed, HDLC Controller 16 transfers the data from its internal receive FIFOs to Frame Buffer Memory 20 via DMA Control 17.

After a full Frame has been written to Frame Buffer Memory 20, HDLC Controller 16 inserts a pointer to the Frame Buffer Memory 20 location in the DMA Control 17 attention queue in Data Pump 19. If there is not enough space in Frame Buffer Memory 20 to write an entire frame, then the partial frame is written into Frame Buffer Memory 20 with an error message. If there is no space available in Frame Buffer Memory 20 or if the DMA Control 17 attention queue in Data Pump 19 is full, then the frame is discarded. The DMA Control 17, however, keeps count of the discarded frames. Each of DMA Control 17a&b can access 15000 (configurable) 512-byte frame buffers. The size of each DMA Control 17 attention queue is 1024 bytes.

The DMA Control (MDF) 17 maintains information regarding the availability of HDLC FIFO Buffer 18 resources (the 128 bytes) and Frame Buffer Memory 20. If none of the 128 bytes in a HDLC FIFO Buffer are available, DMA Control 17 drops the data it receives from an HDLC Controller 16. At the end of each data frame HDLC Controller 16 writes a thirty-two bit End-Of-Frame (EOF) indication to a special address. The EOF indication includes the status of the data frame. The EOF indication is the only mechanism by which DMA Control 17 can identify the end of each data frame. Upon completing each data frame DMA Control 17 sends a message to Data Pump 19, containing the pointer, line and status of a frame to be transferred to Frame Buffer memory 20 to re-assemble the frames/packets for each Logical Data Channel (L,DC). The re-assembled frames for an LDC are then converted into Asynchronous Transfer Mode (ATM) cells and output to the Asynchronous Transfer Mode (ATM) switch fabric (not shown) at the right side of FIG. 1 in a manner well known in the prior art.

Data Pump 19 is the main processor in the IWU for implementing our novel priority queuing, and the Frame Relay network to ATM network inter-working such as virtual circuit mapping and frame buffer management for loss service priority differentiation. At present, there is no standard for the allocation for ATM services to less than a TI/El line so there is no mapping at the channel layer. In performing these functions Data Pump 19 examines the information in each frame Frame header to determine the virtual circuit mapping. It also performs additional processing based on the service/loss priority class of the Frame Relay connection. Later, it also informs SAR 21 that a frame in Frame Buffer Memory 20 is available to be transmitted towards the ATM network.

The Segmentation And Re-assembly (SAR) device 21 is responsible for performing AAL5 protocol processing on the ATM network side and therefore takes the de-multiplexed frames/packets from each data source and converts them into Asynchronous Transfer Mode (ATM) cells that are output to the Asynchronous Transfer Mode (ATM) switch fabric (not shown) at the right side of FIG. 1. This operation is well known in the prior art.

The SAR is responsible for retrieving each frame in Frame Buffer Memory 20, generating any required CPCS-PDU overhead for AAL5, and then segmenting the AAL5 frame into ATM cells. The ATM cells are then sent to an FPGA which generates the HEC byte on the ATM cell header. The complete 53 byte ATM cell is sent at a rate determined by the ATM PVC traffic parameter to the ATM network layer UNI Manager (ALM) in a manner well known in the art. The ALM prefixes a preformatted local header to each ATM cell. The 64 byte ATM cell is then sent to the ATM network Buffer Manager (ABM) (not shown, but well known in the art), which stores it in the cell Data RAM (not shown, but well known in the art).

Figure 4:
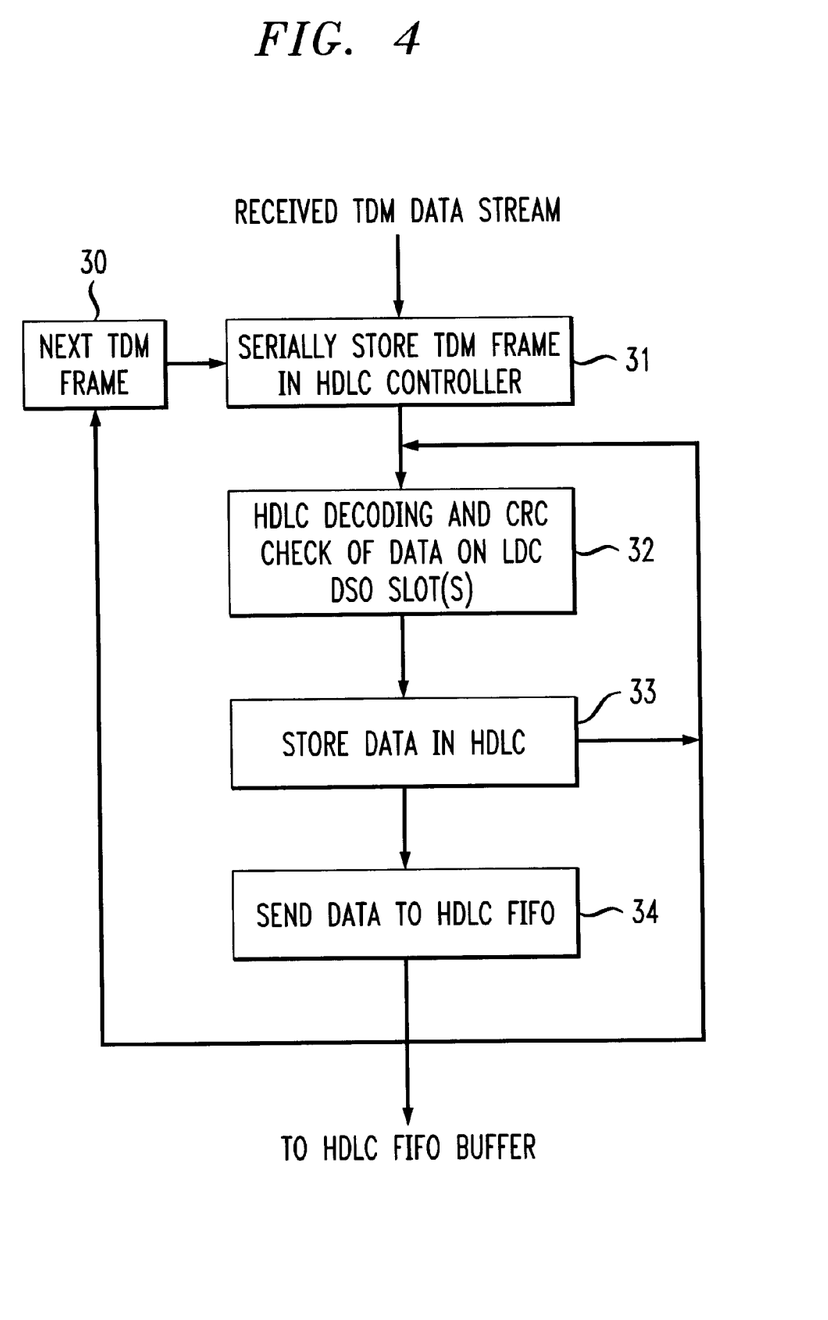
FIG. 4 is a flow chart of steps carried out as data travels in the receive direction through a prior art IWU.

In FIG. 4 is a flow chart showing in more detail how data and frames are moved through HDLC Controllers 16 in the receive direction. The following description applies to each of the HDLC Controllers 16a–c. A TDM data stream from a Logical Data Channel (LDC) is serially received from a Framer 15 and at block 31 thirty-two bits of the LDC data stream are temporarily stored in the HDLC Controller 16 to be checked. At block 32 HDLC Controller 16 performs decoding and CRC error checking on the thirty-two bits of data. At block 33 the decoded and checked data is transferred to a temporary storage to await being transferred at block 34 to a 128 byte HDLC FIFO Buffer 18 which can support 128 HDLC data streams. After a TDM frame has been transferred to the HDLC FIFO Buffer 18 the processing of the next TDM frame is initiated. The data written to the HDLC FIFO buffers 18 is transmitted by DMA Control 17 to the Frame Buffer Memory 20. DMA Control 17 operates sufficiently faster than HDLC Controllers 16 that the system does not require explicit signaling of the next TDM frame. This operation is repeated for each open Logic Data Channel (LDC). With this operation no polling takes place because DMA Controls 17a and 17b are fast enough to handle all data placed in the HDLC FIFO buffers 18a and 18b.

It is the function of each HDLC Controller 16 to map and unmap all HDLC FIFO buffers 18 associated therewith to a logical data channel (LDC). The DMA Control (MDF) 18 maintains information regarding the availability of HDLC FIFO Buffer 18 resources (128 bytes) in its Frame Buffer Memory 20. If none of the 128 bytes in a HDLC FIFO Buffer are available, DMA Control 17 drops the data it receives from an HDLC Controller 16. At the end of a data frame the HDLC Controller 16 writes a thirty-two bit End-Of-Frame (EOF) indication to a special address. The EOF indication includes the status of the data frame. The EOF indication is the only mechanism by which DMA Control 17 can identify the end of each data frame. Upon completing each data frame DMA Control 17 sends a message to Data Pump 19, containing the pointer, line and status of the frame being transferred to Frame Buffer memory 20.

Data Flow in the Transmit Direction

Figure 5:
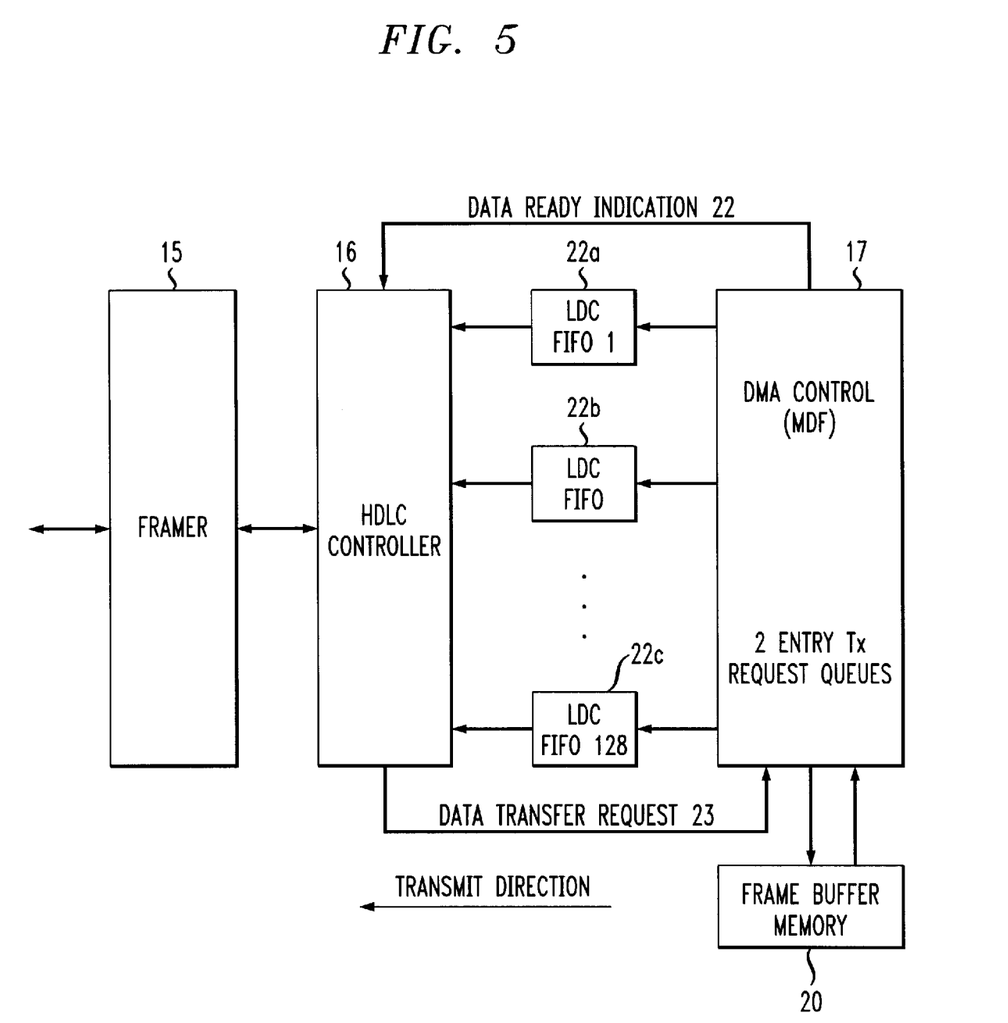
FIG. 5 is a block diagram showing how frames are processed through an IWU in the transmit direction.

In prior art IWU operation in the transmit direction to the left as marked in FIG. 1, ATM cells received from the ATM switch fabric are first stored as data frames/packets in Frame Buffer Memory 20. The HDLC Controller 16 reads out data frames/packets from Frame Buffer Memory 20 and multiplexes them into data streams which are then re-synchronized into a TDM data stream in a manner well known in the art and output to the Frame Relay network (not shown) at the left side of FIG. 1. FIG. 5 shows the elements of the IWU involved with flow of data through the IWU in the transmit direction.

More particularly, The 64-byte ATM cells received from the ATM switch fabric to the right are reformatted into frames by the ABM and stored in the cell data RAM, in a manner well known in the art. These cells are sent to the ALM at a rate programmable in the ABM. The ALM performs VPI/VCI translation on the cell header and sends it to SAR 21. SAR 21 writes the payload portion of the ATM cell to the Frame Buffer Memory 20. The ATM sub-system then creates a data unit descriptor and places it onto one of the SAR 21 attention queues. When Data Pump 19 polls the SAR 21 attention queue, it performs any protocol processing that is required and puts a pointer in the appropriate queue in Quad Port Memory 50. The HDLC Controller 16 uses the structure to determine whether the data indicated by a pointer in Quad Port Memory 50 is ready to be sent. The HDLC Controller 16 then reads the frame in Frame Buffer Memory 20 through the appropriate one of HDLC FIFO Buffers 18a or 18b and outputs the frame to the network (not shown) at the left in FIG. 1 and other Figures. These data frames pass through a queuing mechanism. Upon exiting the queuing mechanism, the data frames are encoded and sent out as a T1/E1 bitstream.

In FIG. 5 HDLC Controller 16 initiates a data frame transfer for a Logical Data Channel (LDC) by placing a data transfer request with DMA Control 17 via lead 23. The request specifies the pointer to where the data is stored in Frame Bufler Memory 20, the data length, and the LDC FIFO 22a–c to which it should be transferred. When DMA Control 17 becomes free, it will initiate a data transfer from Frame Buffer Memory 20 to one of LDC FIFOs 22a–c. DMA Control 17 then informs the requesting HDLC Controller 16 that the data is available in the specified LDC FIFO 22a–c by setting a flag on data ready indication lead 22.

In order to transmit data frames to Framer 15 and thence to the Frame Relay network (not shown), HDLC Controller 16 must first construct the TDM frames. HDLC Controller 16 copies a small amount of data from the specified LDC FIFO 22a–c where the data is stored, as indicated by DMA Control 17 via lead 23, to local memory in HDLC Controller 16 associated with the particular Logical Data Channel (LDC) for which a data frame is being constructed. The construction of the TDM frames requires the HDLC Controller 16 to encoded data in the temporary LDC memory and place it in the appropriate DS0 slots of the frame. HDLC Controller 16 replenishes its IDC local memory from the aforementioned LDC FIFO 22a–c when its store drops below a predetermined threshold.

The HDLC Controller 16 can post a second data frame transfer request with DMA Control 17 while the transmission of the first data frame is in progress. This can be done for up to 384 LDCs. Therefore, DMA Control 17 manages 384 two-entry queues for the in-progress and pending transmission requests. Upon completing the data frame transmission on a particular Logical Data Channel (LDC), RDLC Controller 16 retrieves another data frame descriptor from the appropriate priority ring on the corresponding LDC. The HDLC Controller 16 uses the retrieved data unit descriptor to post its next data transfer request to the DMA Control 17.

Priority Oueuing in the Transmit Direction

In implementing the priority queuing of the present invention in the transmit direction, the HDLC apparatus and functions of the prior art IWU are expanded to implement priority queuing.

Figure 6:
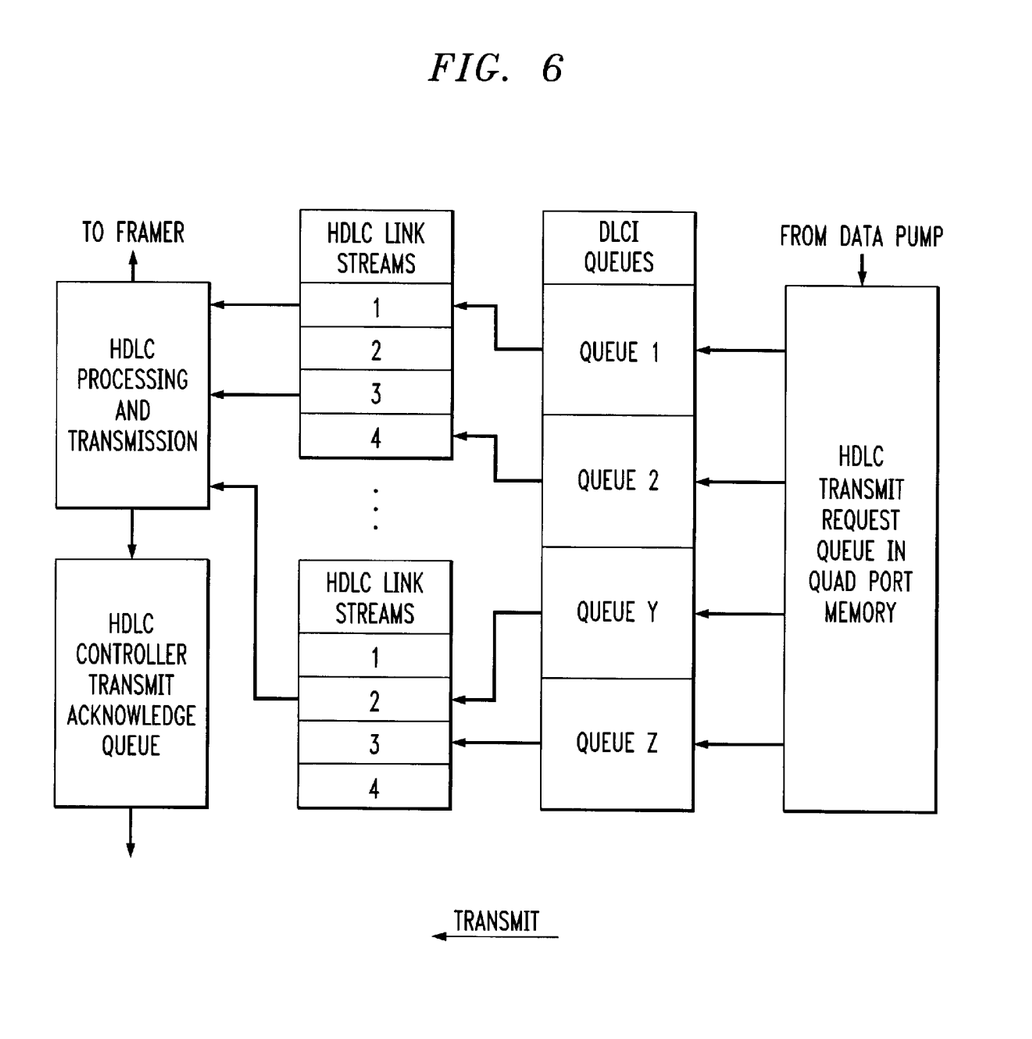
FIG. 6 shows the logical data flow for the priority queuing scheme for data frames sent in the transmit direction.

In FIG. 6 is shown the logical data flow for the priority queuing scheme for data frames sent in the transmit direction, as marked on the Figure. In order to transmit a TDM frame to the Frame Relay network, the DLC Controller 16 (not shown in this Figure) performs priority queuing. The Data Pump 19 (not shown in this Figure) posts a data frame descriptor on a HDLC transmit request queue that resides in Quad Port Memory 50. There is one such queue for each HDLC Controller 16. Each HDLC Controller 16 periodically polls its request queue in Quad Port Memory 50 for a new data frame descriptor and processes it. The HDLC Controller 16 uses information in the data frame descriptor to place the descriptor on its respective DLCI queue. If required, each DLCI queue is enqueued on the link priority ring indicated by the head data frame descriptor in the DLCI queue. The link priority ring is placed on an active list of priority rings, if required.

The order in which data frames are transmitted from a DLCI queue follows a template. This template is derived from a set of programmable counters associated with the priority levels and the DLCI queues. Each priority level has two counters "m" and "n" that are described in greater detail below. These counters define the manner and frequency with which the priority levels are visited, by controlling the transition from a priority level to the next priority level. The transmission starts at the highest priority level and continues until one of the two programmable counters is empty. This event results in a transition to the next lower priority level and the exhausted counter is reloaded. The appropriate DLCI queue on the next lower priority level is serviced once and both its counters are decremented by one. In the event that a counter at the new priority level is empty, control is transferred to the next lower priority level. Otherwise, control is transferred to the highest priority level with data to transmit. This mechanism for transitions between priority levels is followed throughout the priority hierarchy. The number of frames transmitted in a FIFO sequence from a DLCI queue, on a priority level, is defined by a unique counter assigned to that DLCI queue. The DLCI queues at the same priority level are serviced in a round robin manner over successive visits. The priority levels and DLCI queues are maintained on separate dynamic lists. The priority levels and DLCI queues are removed from the lists as they become empty, and added to the lists as new frames appear. This allows empty priority levels and DLCI queues to be skipped.

Priority Queuing Method

Following is described the method steps of our novel priority queuing arrangement that permits data packets from channels that have contracted for a particular level of bandwidth service to be provided that service, even during heavy traffic periods when there is contention for network resources.

With the flow of data packets/frames through the Inter-Working Units (IWU) shown in FIG. 1 as described above, it is now explained how data packets from different Logical Data Channels (LDCs) flowing into a Framer 16 and its associated HDLC Controller 16 can contract for and be assigned different priority levels to obtain given service bandwidth guarantees when data traffic is heavy and there is contention for the resources in the IWU. This is done by creating a priority service queuing template to provide the contracted for service.

A feature of the present invention is that through appropriate parameter settings, our novel priority queuing can be made to approximate a variety of well-known priority schedulers such as the non-preemptive priority discipline and the weighted round-robin scheme.

Consider a logical data link that carries data for "I" different traffic channels, and each channel carries packetized data units. The operation of the invention in the IWU allocates the data link bandwidth between the different traffic channels carried on a logical data channel (LDC) in the transmit direction. Hereinafter the novel hardware and method of the invention is referred to as the "scheduler" for ease of describing the operation of the invention. The objective of the scheduler is to provide service level differentiation between the different traffic channels (LDCs). The scheduler provides service differentiation by controlling the amount of bandwidth that is allocated to each traffic channel based on the amount of bandwidth that has been contracted for. Each traffic channel contracts for and is assigned to a priority level. Therefore there are "I"priority levels, where the traffic channel with the lower number has a higher priority. In the present discussion a single traffic channel is mapped to the priority level $P_i$. The scheme presented can be extended to handle multiple channels per priority level. The logical data link is served by a scheduler which includes the novel changes made to the HDLC and its operation as previously described.

The scheduler provides highest bandwidth and lowest delay service to the traffic channel it visits most frequently. This is the traffic channel that has contracted for the highest priority level of service. Conversely, the scheduler provides lowest bandwidth and highest delay service to the channel it visits least frequently. This is the traffic channel that has contracted for the lowest priority level of service.

In the novel scheme presented, the scheduler follows a template for visiting a set of backlogged traffic channels. The template is specified implicitly in the implementation of the scheduler algorithm and reflects the priority levels of service that have been contracted for. The algorithm uses two counters for each priority level to define the scheduler template. The first counter "$n_i$" is used to facilitate the transition from the current priority level "$P_i$" to the next lower priority level "$P_{i+1}$". The second counter "$m_i$" is used to specify a number "$M_i$" of packets to be handled from the traffic channel having the priority level "$P_i$" during a single visit to the traffic channel having the priority level "$P_i$".

The algorithmic steps followed by the scheduler are given below. The counter "$n_i$" is initialized to an initial limit value "$N_i$". The scheduler decrements the counter "$n_i$" during a visit to the traffic channel having the priority level "$P_i$" and reading out "$M_i$" packets. A transition from priority level $P_i$ to priority level $P_{i+1}$ occurs only on the condition that the count in counter $n_i$ becomes zero. The counter is then reset to its initial limit value $N_i$. The scheduler defaults to the highest active priority level $P_i$ after visiting a lower priority level. The scheduler serves the channels on $P_i$ in a round robin fashion. The scheduler initially begins transmission from $P_i$. The scheduler draws up to $M_i$ packets during a visit to $P_i$.

The priority scheme described provides each priority level a bandwidth guarantee. The mean delay experienced by the data packets on a traffic channel having a particular priority level is implicit in the bandwidth provided to that priority level. The bandwidth provided to a priority level can be computed in terms of the total available bandwidth and the parameters ($N_i$, $M_i$). The total available channel bandwidth is B. The bandwidth available for the priority level $P_i$ is $b_i$. The quantity $b_i$ is given in terms of the total bandwidth B as:
$b_i = B \, W(i)/D$ The numerator W(i) is given as:

$W(i) = M_i \Pi^{I-1}_{j=-1} N_j, i = 1 \ldots I-1$ $W(i) = M_{i-1}$

The denominator D is given as:

$$D = \sum_{j=1}^{I} W(i)$$

The use of two parameters per priority level in the current scheme allows for an efficient and simple implementation of the scheduler. This scheme allows for considerable flexibility in distributing the total bandwidth amongst traffic channels depending on the contracted for priority levels. An illustration of the bandwidth allocation and implicit template generation features of the scheme are described hereinafter. The scheme may in fact be used to provide a higher bandwidth to a lower priority level. This feature of the scheme may prove useful if the scheme is extended to provide dynamic bandwidth allocation.

A specific case of the general prioritization scheme is now described. The description assumes a single link scheduler. The number of priority levels is taken to be four (I=4). Therefore, four traffic channels may have packets available for transmission. The initial limit values for the counters $n_1$ are taken to be $N_i$=3, i=1 ... 3. The scheduler draws a single packet from a traffic channel queue during a visit to that channel's priority level. Therefore, $M_i$=1 for all four priority levels.

We will first consider the case in which all four channels have an infinite backlog of data packets to be forwarded. In this case, the scheduler starts off by transmitting N, packets from the traffic channel having the priority level $P_i$, then it transmits one packet from the traffic channel having the priority $P_2$ before returning to the traffic channel having the priority level $P_1$ and transmitting $N_1$ packets therefrom. This cycle is repeated, until $N_2$ packets have been transmitted having priority level $P_2$. At this point one packet is transmitted from the traffic channel having the priority $P_3$ before returning to the traffic channel having the priority $P_1$ and repeating the cycle of transmitting from the traffic channels having priorities $P_1$ and $P_2$ as described above. The order in which the queues at the different priority levels will be visited when there is infinite backlog will be:

111211121112311121112112311121112111234 where the number 1 represents the traffic channel having the highest priority, the number 2 represents the traffic channel having the second highest priority, the number 3 represents the traffic channel having the third highest priority, and the number 4 represents the traffic channel having the lowest priority. This pattern of visiting the four traffic channels and forwarding their data packets is then repeated over and over. While in the above described example N=3 and M=1 for each priority group, the initial limit value of $N_i$ and number of packets to be drawn $M_i$ may be different for each priority group to change the contracted bandwidth to a very large number of values.

The set of active priorities "A" is defined to be the union of priority levels indices i for which K(i,t)≠0, where K(i,t) is the traffic queue length at priority level i.

$$A(t) = \bigcup_{(\forall i | K(i,t) \neq 0)} i = \{a(1), a(2), a(3), \ldots, a(I_A)\}$$

Therefore, at time the logical link features $I_A(t)$ active priority levels. The set of active priorities $\{a(1), a(2), a(3), \ldots, a(I_A)\}$ is ordered such that a (I) corresponds to the index of the highest active priority. The service provided to an active priority $P_{a(i)}$ is governed by a scheduling algorithm. If there is not an infinite backlog, then whenever the traffic channel queue at a particular priority level becomes empty, the traffic channel is removed from the priority level. When all traffic channel queues are removed from a priority level, the priority level is marked as inactive. As new packets arrive on a traffic channel queue that is not on a priority level, the traffic channel queue is placed on its contracted for priority level. The priority level is marked as active when the first traffic channel queue is placed on that priority level. The scheduler only transmits packets from the active priority levels. This is illustrated by considering a case in which $V_{21}$ becomes empty after the scheduler draws the eighth packet, and becomes reactivated after the sixteenth packet is drawn. The order in which the priority levels are visited in this case is:

10 111211121113111311123411121111211123 . . .

The cycle time C of the scheduler with infinite backlog is given by $N_1 N_2 N_3 + N_2 N_3 + N_3 + 1$. In the example above, the cycle time is 40. The bandwidth of priority level $b_i$ that is used up by class i is given by:

$$b_1 = (B_{N1N2N3})/(N_1N_2N_3+N_2N_3+N_3+1)$$

$$b_2 = (B_{N2N3})/(N_1N_2N_3+N_2N_3+N_3+1)$$

$$b_3 = (B_{N3})/(N_1N_2N_3+N_2N_3+N_3+1)$$

$$b_4 = (B)/(N_1N_2N_3+N_2N_3+N_3+1)$$

The amount of delay for a given priority level under fixed traffic conditions decreases with an increase in the $N_1$ value for that priority level. Note however, that the expected delay for a given priority level will depend on the traffic for that priority level. Note that if we are given $b_1$ for each class i then the value of $N_i$ is given by:

$$N_1 = (B_{i+1})/b_i \text{ for } i=1,2,3$$

Since the values of $N_i$ have to be an integer the solution has to be rounded to the closest integer value. One can show that for the general scheme where the value of $M_i$ is not necessarily one, it is possible to set the values of $M_i$ and $N_1$ to achieve any set of b values.

The method steps or algorithm used for implementing the novel priority scheme is now described. The operation of the prioritization scheme is actually implemented using two component algorithms. The first component algorithm details the steps followed by the scheduler in drawing packets from a link's priority levels. The second component algorithm details the steps followed in placing a new packet on a traffic channel at a particular priority level. Finally, an efficient method for managing and accessing priority levels using features of commercially available CPUs is described.

The algorithms assume that the priority levels $P_i$ and the channels $V_i^k$ are realized as singly linked lists. The priority levels are structured as circular linked lists, while the channels are structured as linear linked lists. These data structure representations allow data packets to be queued on a channel and served on a first come first serve basis. The channels themselves can be queued on to their host priority levels and served in round robin fashion. It is also assumed that each packet, $PDU_j$, carries with it information regarding its host channel $V_i^k$ and the host priority level $P_i$, needed for queueing that packet.

As described above the first component algorithm details the steps followed by the scheduler in drawing packets from a link's priority levels. That algorithm is as follows:

1. Initialize
   Point to $P_{a(i)}$
   Point to $V_{a(i)}$
2. Remove $M_{a(i)}$ data units from $V_{a(i)}$
3. If $V^k_{a(i)}$ is empty then remove it from $P_{a(i)}$
   endif
4. Decrement $n_{a(i)}$
5. If $P_{a(i)}$ has no more channels, then mark $P_{a(i)}$ as inactive
   else
   point to $V_{a(i)k+1}$ to $P_{a(i)}$
   endif
6. If $n_{a(i)}=0$ then
   point to $P_{a(i+1)}$
   reset $n_{a(i)}=N_{a(i)}$
   else
   point to $P_{a(1)}$
   endif As described above the second component algorithm details the steps followed in placing a new packet on a traffic channel having a particular priority level. That algorithm is as follows:

1. A new packet $PDU_j$ arrives
2. Place $PDU_j$ on $V_i^k$
3. If $V_{ik}$ is not on $P_i$, then
   Place $V_{ik}$ on $P_I$
   endif
4. If $P_i$ is marked inactive, then
   Mark $P_i$ as active
   endif In the two component algorithms described above, the details of managing the active and inactive priority levels have been omitted. An efficient method for managing the active and inactive priority levels is now described. The typical approach for managing the active priority level is to maintain the active priorities on a linked list. This list is maintained as an ordered linked list to facilitate quick transitions between the current active priority level and its next lower active priority level. The primary inefficiency in this mechanism is that a search of the ordered active priority list is required to insert a newly activated priority level on to the list.

A more efficient method for managing the priority levels is to use a single bit in a CPU register to maintain the state of a priority level; active=1 and inactive=0. The priority levels are mapped to the register bit locations such that the most significant bit corresponds to the highest priority level, and the least significant bit to the lowest priority level. The priority level contexts are maintained in an array. The priority array index has a one-to-one mapping with the bit location in the state register. The task of marking a priority level as active simply involves setting the appropriate bit in the priority state register. The transition from a current priority to the next lower priority now involves finding the next active bit in the state register. At first glance it may appear that this again requires an expensive search over the bits in the register. However, the location of the next active bit can be determined by utilizing the register normalization instruction featured in certain commercially available processors. This instruction returns the bit shift required to position the highest set bit in the register to the most significant bit location. This instruction typically requires only a single CPU cycle. The steps required to locate the next lower active priority context are given below.

1. Current priority $P_{a(i)}$
   temporary register A
   length of A is R bits
   bit location of $P_{a(i)}$ in state register $L_{a(i)}$
2. Copy state register to register A
3. Mask off the higher order bits of A down to, and including, $L_{a(i)}$
4. Normalize A to get bit shift $S_{a(i+1)}$
5. $L_{a(i+1)} = R - S_{a(i+1)}$, index to next active priority level in context array To describe the novel priority queuing method in another manner, and using the example "11211-121112311121112111231112111211234" in the specification above, there are priorities P1, P2, P3 and P4. Priority P1 is represented by a "1" in the example, priority P2 is represented by a "2" in the example, priority P3 is represented by a "3" in the example, and priority P4 is represented by a "4" in the example. Each priority has two counters as previously described. Thus, priority P1 has initial value counter n, and number of packets to be drawn counter mi. Similarly, priority P2 has initial value counter $n_2$ and number of packets to be drawn counter $m_2$; priority P3 has initial value counter $n_3$ and number of packets to be drawn counter $m_3$; and priority P4 has initial value counter $n_4$ and number of packets to be drawn counter $m_4$.

Figure 7A:
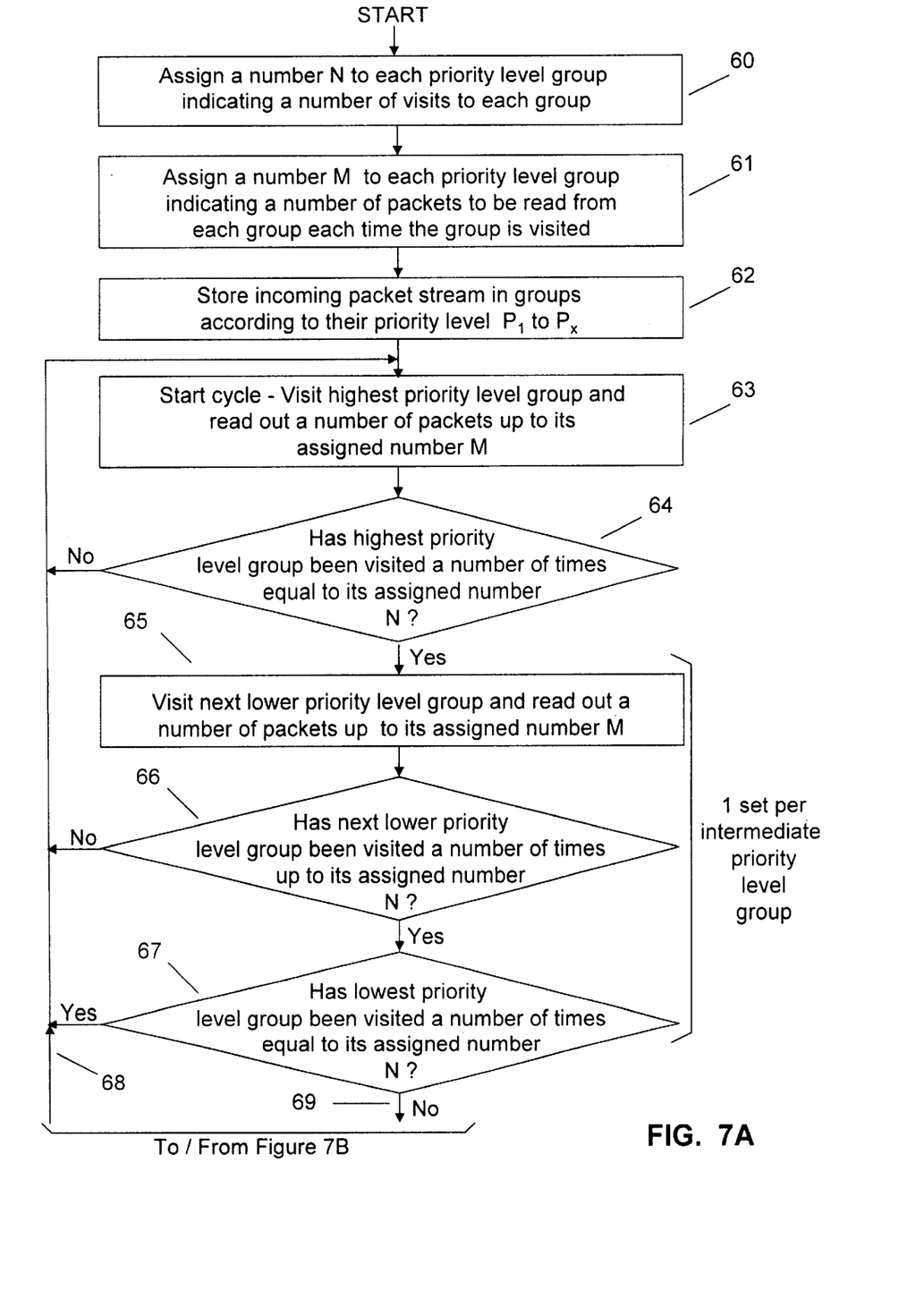
FIGS. 7A and 7B are a flow chart showing the steps in the algorithm implementing the present invention.
Figure 7B:
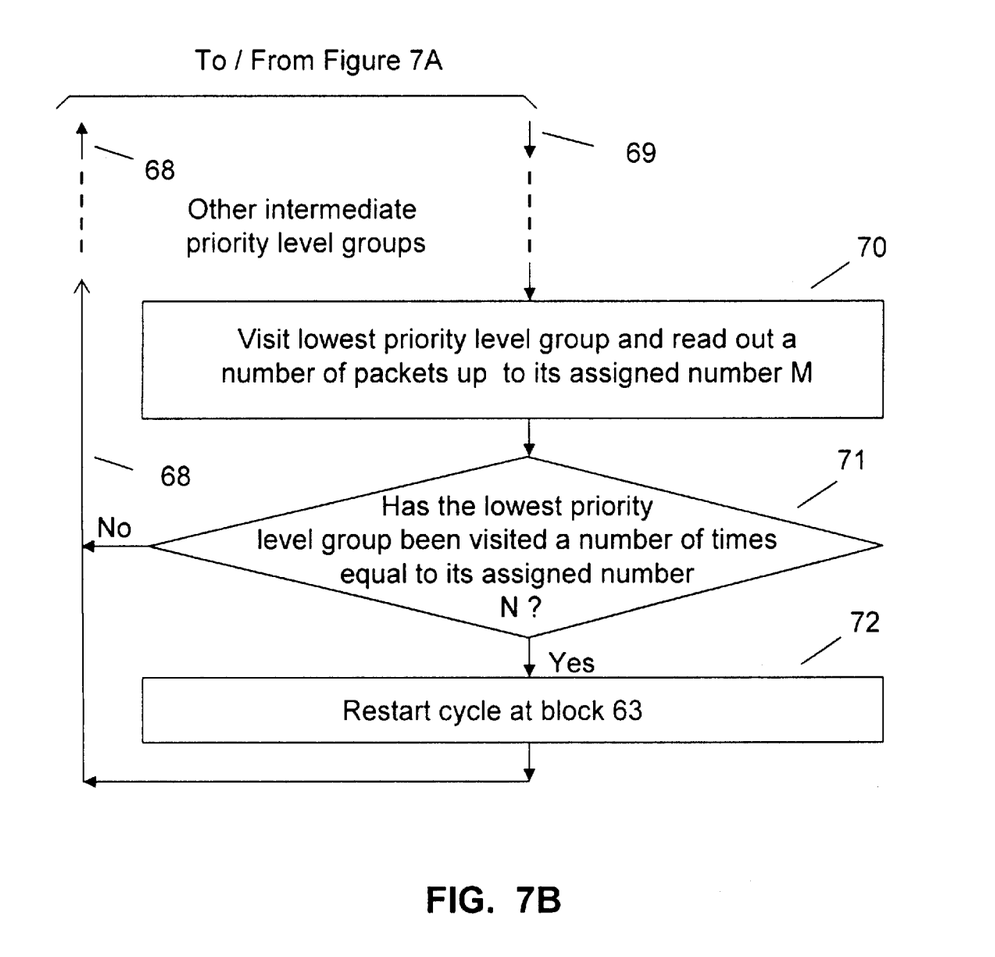

FIG. 7A and 7B show a flow chart of the operations performed in practicing the invention to approximate a variety of priority schedulers while implementing priority queuing.

In the example, the value Ni placed in the initial limit value counters $n_1$ for all priorities is equal to three (N1=N2=N3=3) as represented in block 60 of FIG. 7A, and the value $M_i$ placed in the number of packets to be drawn counters $M_i$ is one (M 1=M2=M3=1) as represented in block 61. Incoming packets are then stored in groups according to their priority level as represented in block 62. With reference to FIGS. 7A and 7B, the sequence of operations is as follows:

1. On the first visit to the queue for priority $P_1$ its initial limit value counter $n_1$ is already set to three (N1=3). Only one priority P1 packet is read out of this queue because its number of packets to be drawn counter $m_1$ has a one therein (M1=1). After a packet is read out at block 63, counter $n_1$ has its value decremented by one from N1=3 to N1=2. No other priority queues $P_i$ are visited because N1≠0 at the start of the first visit. We have the first "1" of the above example.

2. On the second visit to the priority P1 queue at block 63 its initial limit value counter $n_1$ is now set to two (N1=2) as described in the previous step. This cyclical operation is represented at block 64 where a decision is made as to whether or not the priority P1 queue has been read out three times because N1=3. Each time the decision is "No" at block 64, the operation cycles back to block 63 and a priority P1 packet is again read out of this queue because its number of packets to be drawn counter m1 has a one therein (M1=1). After a packet is read out, counter $n_1$ has its value decremented by one from N1=2 to N1=1. No other priority queues $P_i$ are visited because N1≠0 at the start of the second visit. We have the first "11" of the above example.

3. On the third visit to the priority P1 queue at block 63, as described above, its initial limit value counter $n_1$ is now set to one (N1=1) as described in the previous step. A priority P1 packet is again read out of this queue because its number of packets to be drawn counter $m_1$ has a one therein (M1=1). We now have the first "111" of the example. After a P1 packet is read out, counter $n_1$ has its value decremented by one from N1=1 to N1=0. Because N1=0 the algorithm progresses to visit priority queue P2 at block 65 because the decision at block 64 is "Yes" and counter $n_1$ has its value reset to N1=3. A packet is read out of the priority P2 queue at block 65 because its number of packets to be drawn counter $m_2$ has a one stored therein (M2=1). After a priority P2 packet is read out and counter $n_2$ is decremenited by one from N2=3 to N2=2 the process progresses to block 66 where the decision is made as to whether or not the priority P2 queue has been read out 3 times because N2=3. We have the first "1112" of the above example.

4. The queue processing continues and with priority P1 counter $n_1$ reset to N1=3, and priority P2 counter $n_2$ now set at N2=2, the decision at block 66 is "No", the priority P2 queue has not been read out 3 times, and the process cycles back to block 63 where the operation described in steps 1 through 3 above is repeated. After priority queue P2 has been visited the second time its counter $n_2$ has its value decremented by one from N2=2 to N2=1. Priority queue $P_3$ is not visited because N2≠0. We then have the first "11121112" of the above example.

5. The queue processing continues and with priority P1 counter $n_1$ reset to N1=3, and priority P2 counter $n_2$ now set at N2=1, the operation described in steps 1 through 3 above is repeated. After priority queue P2 has been visited the third time its counter $n_2$ has its value decremented by one from N2=1 to N2=0. We then have the "111211121112" of the example and at block 66 the decision is "Yes", the priority queue P2 has been visited three times. The process continues to block 67 where a decision is made as to whether or not priority queue P2 is the lowest priority queue. If the decision is "Yes" the process cycles back to block 63 to repeat the steps described above for blocks 63 through 67. If the decision is "No" at block 67 the process progresses via path 69 to block 70 in FIG. 7B to process packets from the next lower priority queue. At the top of FIG. 7B are dashed lines representing the fact that there may be more intermediate priority queues before the lowest priority queue is reached. Each additional intermediate priority queue has a set of blocks alike blocks 65, 66 and 67 to read out packets from the priority queue.

This is the present case. In the example there are four priority levels 1–4, but in FIGS. 7A and 7B there are only three sets of blocks (63 & 64; 65–67; and 70–72 representing three priority levels. The additional intermediate priority level (not shown) is represented by the dashed lines at the top of FIG. 7B.

When N2=0 the algorithm progresses to visit priority queue P3, represented by the dashed lines, and a counter $n_1$, has its value reset to N1=3, and counter $n_2$ has its value reset to N2=3. One packet is read out of the priority P3 queue because its number of packets to be drawn counter $m_3$ has a one stored therein (M3=1). After a priority P3 packet is read out counter $n_3$ is decremented by one from N3=3 to N3=2. We then have the "1112111211123" of the above example.

7. The queue processing continues and with priority P1 counter $n_1$ reset to N1=3, priority P2 counter $n_2$ reset at N2=3, and priority P3 counter $n_3$ now set at N3=1, the operation describe steps 1 through 6 above is repeated. At the end of these steps counter $n_1$ has its value reset to N1=3, counter $n_2$ has its value reset to N2=3, and counter $n_3$ is decremented by one from N3=1 to N3=0.

Because N3=0 the algorithm progresees to visit priority gueue P4, the lowest priority queue, as represented by block 70. One packet is read out of the lowest priority P4 queue because its number of packets to be drawn counter $m_4$ has a one stored therein (M4=1). At the end of this step we then have the "1112111211123111211121112311121112111234" of the above example. However the process continues because N4=3.

After the first bit is read out of the priority P4 queue the process progresses to block 71 where a decision is made as to whether or not the lowest priority queue P4 has been visited three times. If the decision is "No" the program returns via path 68 to block 63 and the steps represented by blocks 63 through 71 are repeated. When block 71 has been visited three times, and three packets having priority P4 are read out, the decision at block 71 is "Yes" and the program progresses to block 72 to restart the cycle described above by returning back to block 63. We now have three sequential sequences of 1112111211123111211121112311-121112111234 because N4=3.

8. At this point the queuing processing described in steps 1 through 7 is repeated over and over as represented by block 72.

What is claimed is:

1. A method for prioritizing data packets flowing through equipment in packet switched networks to provide contracted levels of bandwidth service through the equipment even when there is a backlog of data packets flowing through the equipment, and each level of bandwidth service has a corresponding priority level, said method comprising the steps of:

receiving a plurality of data packets from the network and each of said packets has been assigned to one of said priority levels;

segregating said received data packets into a plurality of groups based on the priority level assigned to each data packet, with each of said groups being associated with one of said priority levels; and wherein there are priority levels $P_1$ through $P_x$ with level $P_1$ having the highest priority level and level $P_x$ having the lowest priority level, a number N is assigned to each of priority levels $P_1$ through $P_x$ indicating a number of visits to each priority level, a number M is assigned to each of priority levels $P_1$ through $P_x$ indicating the maximum number of packets to be read out to the network during each visit to each priority level;

forwarding said data packets from each of said plurality of priority groups to said network based on the priority level of each group, to provide the contracted level of bandwidth service per the following steps;

(a) visiting priority level $P_1$ a total of $N_1$ times and during each visit up to $M_1$ priority level $P_1$ packets are forwarded to the network before a visit is made to priority level $P_2$ to read out up to $M_2$ priority level $P_2$ packets to the network, (b) repeatedly visiting priority level $P_1$ per step (a) until priority level $P_2$ has been visited a total of $N_2$ times, then priority level $P_x$ is visited to read out up to $M_x$ priority level $P_x$ packets to the network, (c) repeating steps (a) and (b) until priority level $P_x$ is visited a total of $N_x$ times with up to $M_x$ priority level $P_x$ packets being read to the network each time, and (d) repeatedly visiting priority levels $P_1$ through $P_x$ per steps (a) through (c) until priority level $P_x$ has been visited a total of $N_x$ times, then steps (a) through (c) are repeated.

2. A method for approximating a variety of well-known traffic priority schedulers used in packet switched networks to provide contracted levels of bandwidth service through the networks, and each level of bandwidth service has a corresponding priority level, said method comprising the steps of:

receiving a plurality of data packets and each of said packets has been assigned to one of said priority levels;

(a) segregating said received data packets into a plurality of groups based on the priority level assigned to each data packet, with each of said groups being associated with one of said priority levels;

(b) assigning a number N to each priority level group indicating a number of visits to each priority level; and (c) assigning a number M to each priority level group indicating the maximum number of packets of each priority level to be forwarded over the network during each visit to each priority level;

(d) visiting the highest priority level group a number of times equal to its assigned number N and during each visit a number of packets up to its assigned number M are forwarded over the network;

(e) visiting the second highest priority level group one time and during the visit a number of packets up to its assigned number M are forwarded over the network;

(f) repeating steps (d) and (e) until the second highest priority level group has been visited a number of times equal to its assigned number N;

(g) visiting each priority level group below the second highest priority level group one time in descending order of priority level after the priority level group having the next higher priority level has been visited a number of times up to its assigned number N and during the one time visit to each priority level group a number of packets equal to its assigned number M are forwarded over the network;

(h) repeating steps (d) through (g) until a priority level group being visited in step (g) is visited a number of times equal to its assigned number N; and (i) repeating steps (d) through (h) after the priority level group having the lowest priority is visited a number of times equal to its assigned number N.

3. The method in accordance with claim 1 wherein the values of the numbers $N_1$ through $N_x$ and $M_1$ through $M_x$ are assigned to provide a contracted level of bandwidth service.

4. The method in accordance with claim 3 wherein when there are no data packets passing through said equipment for one of said priority groups, there are no data packets to be transmitted from said one of said priority groups and the method of operation described in claim 1 progresses to transmit data packets from the next priority group.

5. The method in accordance with claim 3 wherein by picking appropriate values for $N_1$ through $N_x$ and $M_1$ through $M_x$ the prioritization of data packets may be made to approximate the operation of many well known priority schedulers.

6. The method in accordance with claim 5 wherein when there are no data packets passing through said equipment for one of said priority groups, there are no data packets to be transmitted from said one of said priority groups and the method of operation described in claim 1 progresses to transmit data packets from the next priority group.

7. The method in accordance with claim 6 wherein said equipment connects Frame Relay Networks and ATM networks and the invention prioritizes data packets flowing from ATM networks to Frame Relay network.

8. The method in accordance with claim 2 wherein by picking appropriate values for $N_1$ through $N_x$ and $M_1$ through $M_x$ the prioritization of data packets may be made to approximate the operation of many well known priority schedulers.

9. The method in accordance with claim 8 wherein the values of the numbers $N_1$ through $N_x$ and $M_1$ through $M_x$ are assigned to provide a contracted level of bandwidth service.

10. The method in accordance with claim 1 wherein said equipment connects Frame Relay networks and ATM networks and the invention prioritizes data packets flowing from ATM networks to Frame Relay networks.

11. The method in accordance with claim 10 wherein by picking appropriate values for $N_1$ through $N_x$ and $M_1$ through $M_x$ the prioritization of data packets may be made to approximate the operation of many well known priority schedulers.

12. The method in accordance with claim 11 wherein the values of the numbers $N_1$ through $N_x$ and $M_1$ through $M_x$ are assigned to provide a contracted level of bandwidth service.

13. The method in accordance with claim 12 wherein when there are no data packets passing through said equipment for one of said priority groups, there are no data packets to be transmitted from said one of said priority groups, and the method of operation described in claim 1 progresses to transmit data packets from the next priority group.

14. The method in accordance with claim 10 wherein the values of the numbers $N_1$ through $N_x$ and $M_1$ through $M_x$ are assigned to provide a contracted level of bandwidth service.

15. Apparatus for prioritizing data packets flowing through equipment in packet switched data networks, said equipment having a plurality of channels carrying data packets and each channel has a predetermined contracted bandwidth, said equipment providing said contracted levels of bandwidth service to each channel, and each level of bandwidth service has a corresponding priority level, said apparatus comprising:

a plurality of buffer queues, a buffer queue being associated with each channel and its corresponding priority level, data packets for each channel being temporarily stored in an assigned one of said buffer queues, said buffer queues being visited starting from the highest priority and progressing to the lowest priority to transmit data packets to the network according to said predetermined contracted bandwidths;

a first counter associated with each of said plurality of buffer queues, each said first counter being loaded with a number indicating the number of data packets to be transmitted from its associated buffer queue to the network each time the buffer queue is visited to read out data packets to the network; and a second counter associated with each of said plurality of buffer queues, each said second counter being loaded with a number indicating a number of visits to be made to its associated buffer queue to transmit to the network the number data packets indicated by the associated one of said first counters before progressing to the next lower priority queue to transmit the number of data packets indicated by its associated first counter.

* * * * *